May 9, 1961
R. H. JOHNSON
2,983,038
METHOD OF ATTACHING A STRUCTURAL MEMBER TO A CORE OF A STRUCTURAL SANDWICH
Filed March 24, 1958
2 Sheets-Sheet 1
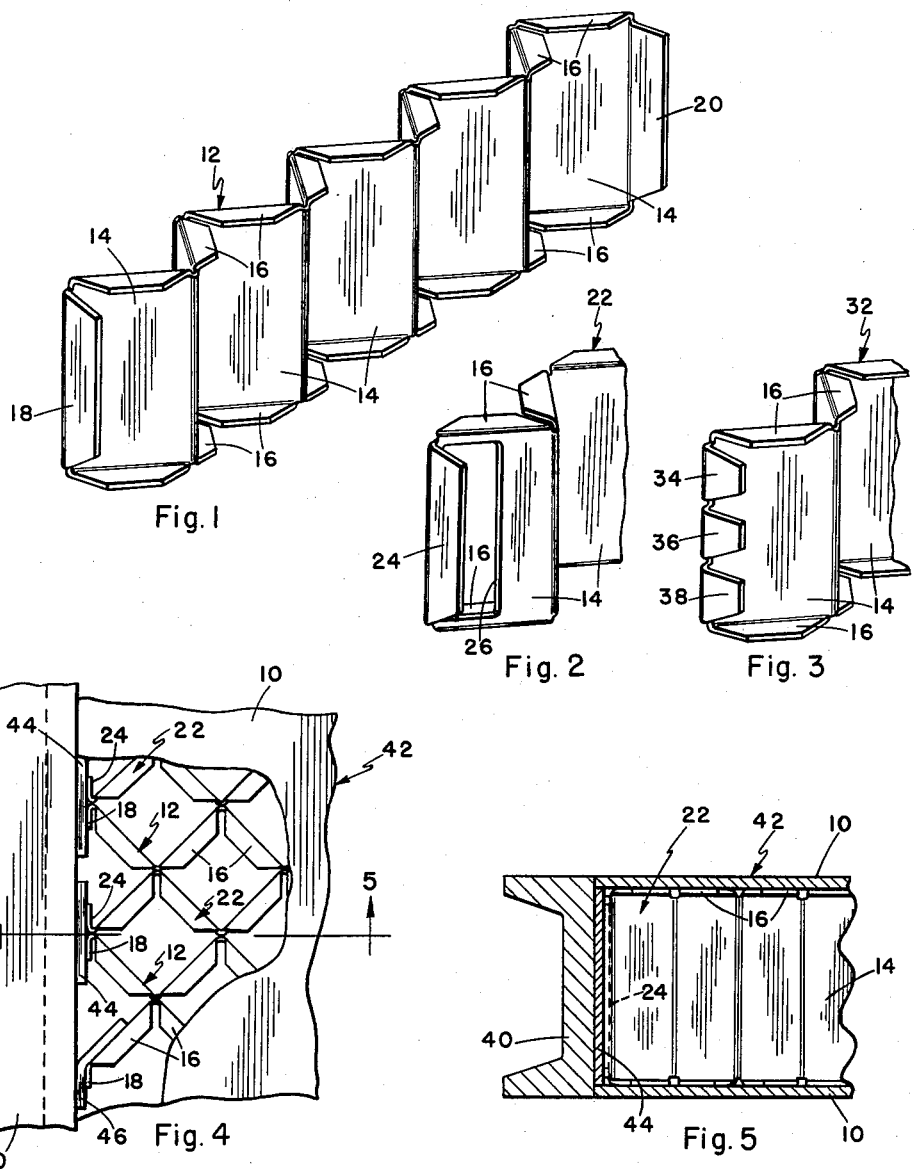
INVENTOR.
RAYMOND H. JOHNSON
BY
Knox & Knox

United States Patent Office 2,983,038
Patented May 9, 1961

2,983,038

METHOD OF ATTACHING A STRUCTURAL MEMBER TO A CORE OF A STRUCTURAL SANDWICH

Raymond H. Johnson, Chula Vista, Calif., assignor to Bahia Mision Development Co., Inc., San Diego, Calif.

Filed Mar. 24, 1958, Ser. No. 723,370

1 Claim. (Cl. 29—471.1)

The present invention relates generally to sandwich structures and more particularly to a structural sandwich and method of attaching structural members to the core thereof.

The primary object of this invention is to provide a structural sandwich comprising a pair of metallic sheets with a honey comb type core welded between them, the core being composed of a plurality of individual strips each having tab elements at their ends to facilitate attachment of relatively large structural members to the core.

Another object of this invention is to provide a structural sandwich in which intermediate members are inserted between the core tabs and the structural members to facilitate welding of the thin core strips to the thick structural member, the intermediate members being somewhat thicker than the core strips but thinner than the structural members.

Another object of this invention is to provide a structural sandwich in which the core end tabs may be arranged to enable various core configurations and structural members to be used.

Still another object of this invention is to provide a structural sandwich in which the structural members may be attached to an edge of the panel or may be completely enclosed within the panel.

Finally, it is an object to provide a structural sandwich of the aforementioned character which is simple and convenient to assemble and which may be accurately made within close tolerances.

With these and other objects definitely in view, this invention consists in the novel construction, combination and arrangement of elements and portions, as will be hereinafter fully described in the specification, particularly pointed out in the claim, and illustrated in the drawings which form a material part of this disclosure, and in which:

Figure 1 is a perspective view of an end portion of an individual core strip;

Figures 2 and 3 are perspective views similar to Figure 1, showing alternative tab arrangement and structure;

Figure 4 is a fragmentary top plan view of a sandwich with a structural member attached, the outer skin being cut away to reveal the internal structure;

Figure 5 is a fragmentary sectional view taken on the line 5—5 of Figure 4;

Similar characters of reference indicate similar or identical elements and portions throughout the specification and throughout the views of the drawings.

Figure 6:
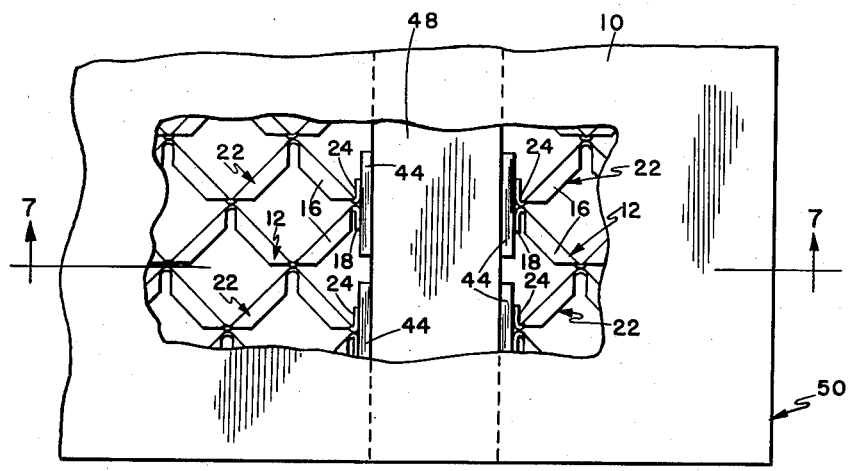
Figure 6 is a fragmentary top plan view of a sandwich having a structural member secured internally, the outer skin being partially cut away.

Referring now to the drawings in detail, the sandwich structure comprises a pair of substantially coextensive, spaced outer sheets or skins 10 between which is a core structure composed of a plurality of individual core strips 12. The zig-zag configuration of the core strips 12 is one convenient form, but it should be understood that other types of core strips may be used. Each core strip 12 comprises a plurality of generally rectangular upright walls 14 arranged in a continuous zig-zag configuration, each wall having flanges or skin-contacting tabs 16 at the opposite ends, said tabs being substantially parallel to each other, in the case of the usual panel of uniform thickness, to lie flat against the skins 10 and provide contact surfaces for welding the core to the skins. This type of sandwich structure and the method of manufacture thereof is described in full in my U.S. Patent No. 2,820,882, relating to a process for welding metallic sandwich structures.

The core strip 12 has an end tab 18 extending from the upright edge of the end wall portion 14 and bent to lie substantially normal to the longitudinal dimension of the core strip. In Figure 1, the end tab 18 is shown as extending to the same side of the core strip as the upper and lower skin-contacting tabs 16. This end tab 18 may be return folded from the wall 14, which is angled in the opposite direction as shown, or may extend at less sharply angulated relation from another wall portion 14 as indicated at 20, the primary requisite being that the end tab is on the same side of the strip 12 as the skin-contacting tabs 16.

Figure 2 shows a slightly different core strip 22, in which the end tab 24 is bent to the opposite side from the tabs 16 and an access opening 26 is provided in the wall 14 adjacent said end tab for reasons which will later be apparent. A further type of core strip 32 is shown in Figure 3, which is similar in all respects to the core strip 12, except that the end tab is divided into three portions, an upper tab portion 34, a center tab portion 36 and a lower tab portion 38.

The various end tabs enable the core as well as the skins of the sandwich structure to be securely bonded to a rigid structural member. One such assembly is shown in Figures 4 and 5, in which a channel member 40 is secured to one edge of a sandwich panel 42. The core structure is built up from alternate core strips 12 and 22 arranged so that the end tabs 18 and 24 are turned in opposite directions in adjacent pairs. To facilitate welding the thin end tabs to the heavy channel member 40, intermediate attachment plates 44 are welded to the end tabs themselves. These attachment plates 44 are generally rectangular and are substantially thicker than the material of the core strips, each plate being ordinarily, although not necessarily, welded to an adjacent pair of end tabs 18 and 24. The channel member 40 is then welded to the edges of the skins 10 and to the attachment plates 44 to complete a rigid structural assembly. Since the core strips 12 and 22 are all inserted from one end during assembly of the panel, as described in the above mentioned Patent No. 2,820,882, the access openings 26 are necessary to admit a welding electrode through the wall of each core strip 22 to weld the end tab 24 to the particular attachment plate 44. To secure a single core strip 12 at one point to the channel member 40, a generally L-shaped attachment plate 46 may be used, this particular plate being bent to fit against the wall 14 and the end tab 18 for maximum contact area for welding. All of the attachment plates 44 and 46 extend beyond the end tabs on both sides to provide a large welding area on the channel member 40 for maximum strength.

Figure 7:
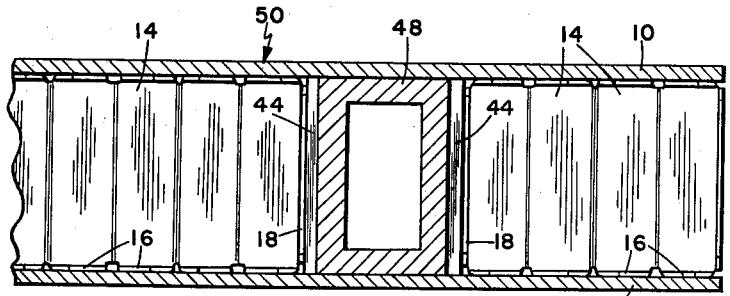
Figure 7 is a sectional view taken on the line 7—7 of Figure 6.

A further embodiment of this invention is illustrated in Figures 6 and 7, wherein a beam member 48 is contained within the sandwich panel 50. The structure is similar to that shown in Figures 4 and 5, except that core strips 12 and 22 are secured to both sides of the beam member 48 and the skins 10 are extended across the beam member, completely enclosing it inside the panel 50. The end tabs 18 and 24 are welded in pairs to attachment plates 44, as in Figure 4, and the attachment plates are welded to the beam member 48 to form an extremely rigid integral structure.

Figure 8:
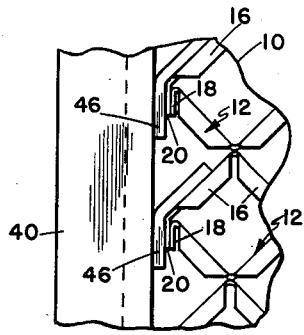
Figure 8 is a fragmentary top plan view similar to Figure 4, showing an alternative core strip arrangement.

The structure shown in Figure 8 is basically similar to that shown in Figure 4, but this arrangement eliminates the need for using a special electrode to weld the tabs 24 through the adjacent access openings. This is accomplished by utilizing core strips 12 having alternate end tabs 18 and 20 which extend in the same direction at their junction and are overlapped. The overlapping end tabs 18 and 20 are together welded to L-shaped attachment plates 46 which, in turn, are welded to the channel member 40.

Figure 9:
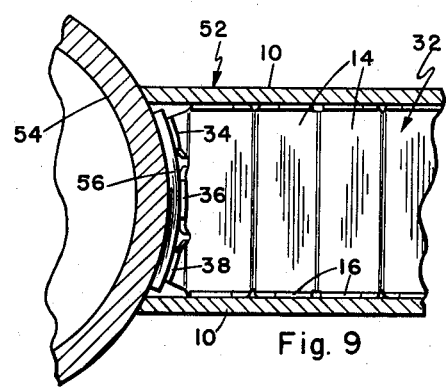
Figure 9 is a fragmentary sectional view similar to Figure 5, but showing the core attached to a curved structural member.

A further arrangement is shown in Figure 9, in which the panel 52 is attached to a curved structural member 54 by using core strips 32 having the divided end tabs. Each core strip 32 is welded to a curved attachment plate 56, the upper and lower end tab portion 34 and 38 being bent to contact the surface of the attachment plate on either side of the center tab portion 36. In this manner, the sandwich type structure may be secured to various shapes of structural members.

It will be noted that in every instance the end tabs 18 and 20 are employed and the intermediate plates are preferably first bonded to the end tabs and subsequently bonded to the structural member. It is also noteworthy that adjacent end tabs 18 and 20 or the analogous adjacent portions 34—38 always at least approach coplanar relationship.

The use of a heavy structural member integral with a light weight sandwich panel, enables the panel to be secured directly to surrounding stressed structural elements without further reinforcing, and various types of fittings may be bolted or rivetted to the structural member. The sandwich type panels are often used as the outer skin panels of aircraft and, as such, must carry miscellaneous items of equipment within the aircraft. By inserting a rigid structural member inside the panel, as in Figure 6, a strong attachment area is provided for such equipment without undue overall weight of structure. The end tabs on the various core strips are essential to provide an effective bonding area between the core and the structural member for maximum strength and the introduction of intermediate plates, between the relatively thin core strip tabs and the relatively thick structural members, permits thermal bonding procedures to be carried out without any great danger of heat damage to the thin core structure.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

The method of attaching a structural member to thin core strips of a structural sandwich panel comprising: introducing intermediate thickness plates, of a thickness less than the adjacent portion of the structural member and greater than the thickness of the core strips, between said structural member and the adjacent edges of said core strips, and welding said intermediate thickness plates first to said edges of the core strips and then to said structural member.

References Cited in the file of this patent
UNITED STATES PATENTS
2,814,989   Sites _____ Dec. 3, 1957